No. 762,951. PATENTED JUNE 21, 1904.
D. SHILDTS.
FARM GATE.
APPLICATION FILED MAR. 26, 1904.
NO MODEL. 2 SHEETS—SHEET 1.
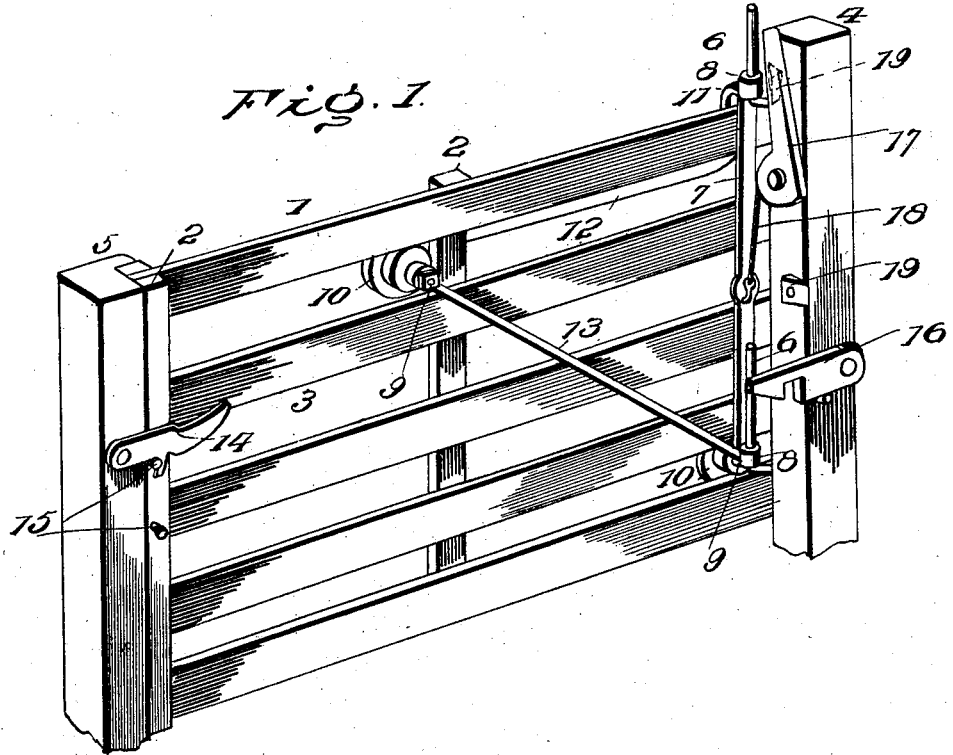
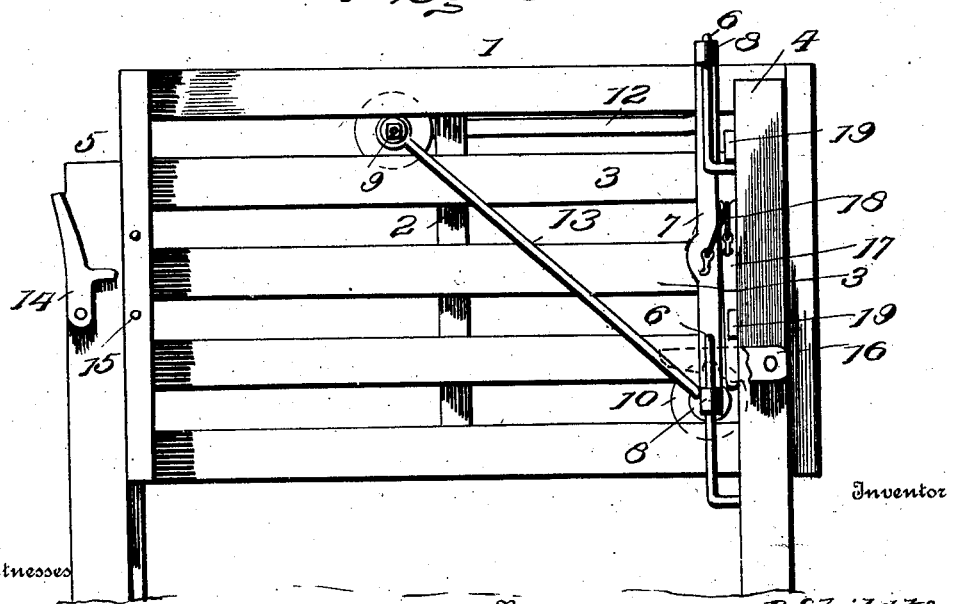

No. 762,951. PATENTED JUNE 21, 1904.
D. SHILDTS.
FARM GATE.
APPLICATION FILED MAR. 26, 1904.

NO MODEL. 2 SHEETS—SHEET 2.

Fig. 2.

Fig. 4.

Witnesses

Inventor
D. Shildts
By
R. S. & A. B. Lacey, Attorneys

No. 762,951. Patented June 21, 1904.

UNITED STATES PATENT OFFICE.

DAVID SHILDTS, OF SCIO, OHIO.

FARM-GATE.

SPECIFICATION forming part of Letters Patent No. 762,951, dated June 21, 1904.

Application filed March 26, 1904. Serial No. 200,143. (No model.)

*To all whom it may concern:*

Be it known that I, DAVID SHILDTS, a citizen of the United States, residing at Scio, in the county of Harrison and State of Ohio, have invented certain new and useful Improvements in Farm-Gates, of which the following is a specification.

This invention provides improvements in gate structures particularly adapted for use as farm-gates. The gate is peculiarly mounted so as to be adapted for both slidable and swinging movement, and special means are provided for vertically adjusting the gate so that the same may be readily opened or operated under all conditions of service.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1 is a perspective view of the gate closed. Fig. 2 is a perspective view of the gate opened. Fig. 3 is a side elevation of the gate, same being shown in elevated position upon the gate-post. Fig. 4 is a detail view of the supporting members carried by the gate-post upon which the gate is mounted for movement.

Corresponding and like parts are referred to in the following description and indicated in all the views of the drawings by the same reference characters.

The gate 1 is of the type composed of vertical bars 2 and horizontal extending bars 3. The gate-post 4 constitutes the main supporting means to which the gate is attached, and a latch-post 5 is located a short distance from the said gate-post for coöperation with the gate in the usual manner. Projected from the gate-post 4 are pintle members 6, vertically disposed, and journaled upon the pintle members 6 is a vertical supporting-bar 7. The supporting-bar 7 has projected therefrom journal members 8, which receive the pintle members 6 of the supporting-bar 7. The supporting-bar is thus adapted for a rotatory and vertical movement relative to the gate-post. A shaft 9 extends laterally from the lower portion of the supporting-bar 7, and a roller 10 is journaled upon this shaft, being secured thereon by any suitable means. An extension 11, projected laterally from the upper portion of the supporting-bar 7, spans the uppermost of the horizontal bars 3 of the gate, and this extension 11 carries a horizontal bar 12, which latter has disposed upon the end portion thereof a shaft 9, similar to that carried by the supporting-bar 7. A roller 10 is journaled upon this latter-mentioned shaft. The upper and lower rollers 10, which are carried by the horizontal and vertical supporting-bars 12 and 7, respectively, constitute the direct supporting means which carries the gate 1. The gate is adapted for a slidable movement upon the rollers 10, and since these rollers are carried by the main vertical supporting-bar 7, either directly or indirectly, it will be noted that the gate is adapted for a swinging or rotatory movement as well as the slidable movement above mentioned. A brace-bar 13 connects the upper and lower shafts 9, and this brace-bar is disposed upon the side of the gate opposite to that upon which the horizontal supporting-bar 12 is located. The brace-bar not only serves as a brace means connecting the parts aforesaid, but serves to prevent any likelihood of displacement of the gate 1 from the rollers 10.

A latch 14 is pivotally supported by the latch-post 5, and this latch member is adapted to engage pins 15, carried by the gate 1, to prevent slidable or swinging movement of the gate. In its swinging movement the gate may be locked open by means of a second latch 16, which is pivoted to the gate-post 4, the last-mentioned latch being adapted to engage an adjacent horizontal bar 3 of the gate.

Should it be necessary to elevate the gate in order to admit of free opening or closing movement thereof, which might otherwise be interfered with due to accumulation of snow, mud, or the like beneath the gate, a lever 17 is utilized. The lever 17 is pivoted to the upper portion of the gate-post 4 and is provided at one end with a handle by which its operation may be facilitated. A flexible connection 18 connects the opposite end of the lever with the vertical supporting-bar 7. A pivotal movement of the lever 17 will impart a vertical movement to the supporting-bar 7, and since the rollers 10 are carried by the supporting-bar a vertical movement of this supporting-bar 7 will elevate the gate, which is mounted upon the said rollers 10. The gate is locked in its elevated position by means of a projection 19, extended from the post 4, adjacent thereto, which projection is adapted to engage the said lever, as shown most clearly in Fig. 3. A second projection 19 limits the upward movement of this lever in an obvious manner. The latch 14 upon the latch-post is adapted for coöperation with the pins 15 when the gate is closed in either of its lowered or elevated positions. Likewise the latch 16, which is carried by the gate-post 4 and which is utilized to lock the gate open, is adapted to engage the horizontal bars 3 of the gate 1 in either of the positions of the said gate.

From the foregoing it will be noted that in order to pass the gate it is not necessary to open the same entirely by imparting a swinging movement thereto. When vehicles are passing through the gate, however, it is desirable that same be entirely opened, and for this purpose it should be given both a swinging and slidable movement, preferably. It will be understood that the preferred form of the parts only is illustrated and that the structural details of the invention may be modified as found most suitable in the practical use of the device.

Having thus described the invention, what is claimed as new is—

In combination, a gate-post, pintle members projected from the gate-post, a vertical supporting-bar journaled to the pintle members aforesaid upon one side of the gate and vertically adjustable upon said members, an extension projected laterally from the upper end of the vertical supporting-bar and spanning the upper portion of the gate, a shaft projected from the lower portion of the vertical supporting-bar, a horizontal supporting-bar carried by the extension of the vertical supporting-bar and located upon the side of the gate opposite to that upon which the vertical supporting-bar is disposed, a shaft projected from the horizontal supporting-bar at the end remote from the extension, rollers mounted upon the shafts of the vertical and horizontal supporting-bars, and a brace connecting the shafts aforesaid, said brace being upon the side of the gate adjacent which the vertical supporting-bar is located.

In testimony whereof I affix my signature in presence of two witnesses.

DAVID SHILDTS. [L. S.]

Witnesses:
W. G. HERRON,
J. G. CROGHAN.